United States Patent
Desellem et al.

(10) Patent No.: US 10,653,996 B1
(45) Date of Patent: May 19, 2020

(54) SELECTIVE NON-CATALYTIC REDUCTION (SNCR) OF NOX IN FLUIDIZED BED COMBUSTION REACTORS

(71) Applicant: The Babcock & Wilcox Company, Barberton, OH (US)

(72) Inventors: James F Desellem, Salineville, OH (US); Mandar R Gadgil, North Sioux City, SD (US); Laura M McDermitt, Wadsworth, OH (US); Margaret Yeager, Clinton, OH (US); Thomas J Flynn, N. Canton, OH (US)

(73) Assignee: The Babcock & Wilcox Company, Akron, OH (US)

( * ) Notice: Subject to any disclaimer, the term of this patent is extended or adjusted under 35 U.S.C. 154(b) by 0 days.

(21) Appl. No.: 16/410,315

(22) Filed: May 13, 2019

(51) Int. Cl.
*B01D 53/56* (2006.01)
*F23R 3/00* (2006.01)
*C10L 5/44* (2006.01)

(52) U.S. Cl.
CPC ............ *B01D 53/56* (2013.01); *F23R 3/005* (2013.01); *B01D 2252/102* (2013.01);
(Continued)

(58) Field of Classification Search
CPC ........ B01D 53/56; B01D 53/74; B01D 53/76; B01D 53/78; B01D 2251/2062;
(Continued)

(56) References Cited

U.S. PATENT DOCUMENTS 5,048,432 A * 9/1991 Hofmann ................ F23C 10/10
110/211
5,237,939 A * 8/1993 Spokoyny ................ F23J 15/02
110/345

(Continued)

FOREIGN PATENT DOCUMENTS

CN 1135319 C * 1/2004 ............. F23C 10/10
EP 0 936 405 A1 * 8/1999 ............. F23C 10/00

*Primary Examiner* — Timothy C Vanoy
(74) *Attorney, Agent, or Firm* — Michael J. Seymour

(57) ABSTRACT

The present invention relates generally to the field of emission control equipment for boilers, heaters, kilns, or other flue gas-, or combustion gas-, generating devices (e.g., those located at power plants, processing plants, etc.) and, in particular to a new and useful method and apparatus directed to one or more of: (i) reducing the levels of $NO_x$ from one or more types of combustors, furnaces or boilers; (ii) reducing the levels of $NO_x$ from one or more types of biomass combustors, furnaces or boilers; or (iii) reducing the levels of $NO_x$ from one or more types of fluidized bed biomass combustors, furnaces or boilers. In one embodiment, the method and apparatus of the present invention permit the use of a less complex and/or expensive system to accomplish selective non-catalytic reduction (SNCR) and enable one to achieve $DeNO_x$ ($NO_x$ reduction) under low load or unit turndown operation for biomass combustion in a bubbling fluidized bed (BFB) boiler.

22 Claims, 4 Drawing Sheets

(52) U.S. Cl.
CPC .... *B01D 2252/204* (2013.01); *B01D 2256/10* (2013.01); *B01D 2257/402* (2013.01); *B01D 2257/404* (2013.01); *C10L 5/447* (2013.01)

(58) Field of Classification Search
CPC .......... B01D 2251/21; B01D 2257/404; B01D 2258/0283; B01J 10/00; B01J 12/00; F23J 2215/10; F23J 15/02; F23C 10/08; F23C 10/10; F23C 2201/00; F23C 2206/10; F23C 2900/06043
See application file for complete search history.

(56) References Cited

U.S. PATENT DOCUMENTS

| | | | | |
|---|---|---|---|---|
| 5,911,956 | A * | 6/1999 | Viel Lamare | B01D 53/56 422/177 |
| 7,168,947 | B2 * | 1/2007 | Zamansky | F22B 1/22 431/10 |
| 7,622,091 | B2 * | 11/2009 | Morrison | B01D 53/56 422/168 |
| 8,501,131 | B2 * | 8/2013 | Moyeda | B01D 53/56 423/235 |
| 2008/0220387 | A1 * | 9/2008 | Payne | B01D 53/56 431/253 |
| 2009/0047199 | A1 * | 2/2009 | Arrol | B01D 53/56 423/210 |

\* cited by examiner

SELECTIVE NON-CATALYTIC REDUCTION (SNCR) OF NOX IN FLUIDIZED BED COMBUSTION REACTORS

FIELD AND BACKGROUND OF THE INVENTION

1. Field of the Invention

The present invention relates generally to the field of emission control equipment for boilers, heaters, kilns, or other flue gas-, or combustion gas-, generating devices (e.g., those located at power plants, processing plants, etc.) and, in particular to a new and useful method and apparatus directed to one or more of: (i) reducing the levels of $NO_x$ from one or more types of combustors, furnaces or boilers; (ii) reducing the levels of $NO_x$ from one or more types of biomass combustors, furnaces or boilers; or (iii) reducing the levels of $NO_x$ from one or more types of fluidized bed biomass combustors, furnaces or boilers. In one embodiment, the method and apparatus of the present invention permit the use of a less complex and/or expensive system to accomplish selective non-catalytic reduction (SNCR) and enable one to achieve $DeNO_x$ ($NO_x$ reduction) under low load or unit turndown operation for biomass combustion in a bubbling fluidized bed (BFB) boiler.

2. Description of the Related Art

Fluidized combustion of particulate solid fuels such as coal is well known. Processes of this type are disclosed in *Steam/its generation and use,* $42^{nd}$ Edition, Tomei Editor, Copyright 2015, The Babcock & Wilcox Company, Barberton, Ohio, U.S.A. (see, e.g., Chapter 17). Two main types of fluidized combustion are utilized: (i) bubbling fluidized bed (BFB) boilers; and (ii) circulating fluidized bed (CFB) boilers. FIG. 1 illustrates the main features of a bubbling fluidized-bed (BFB) boiler. As illustrated therein, the bottom of the furnace in a BFB boiler consists of a horizontal air distributor with bubble caps. This provides the fluidizing air to the bed material in the lower furnace. The bubble caps are closely spaced so that air flow is distributed uniformly over the furnace plan area. The lower furnace is filled with 2 feet (0.6 meters) of sand or other noncombustible material such as crushed limestone or bed material from prior operation. Air flow is forced upward through the bed of material, and the bed expands to a depth of about 3 feet (0.9 meters) taking on most of the characteristics of a fluid. The air flow through the bed is very uniform due to a high number of air distributors (bubble caps) and bed pressure drop. A typical nominal design superficial velocity of 8 feet/sec (2.4 meters/sec) is enough to fluidize BFB bed material with a particle size distribution between 500 and 1400 microns. The boiler enclosure is made of water-cooled membrane panels.

The Babcock & Wilcox Company (B&W) offers two air distributor systems for its BFB boilers: open bottom and flat floor systems. The open bottom system shown in FIG. 2 and is characterized by the fluidizing air bubble caps and pipes mounted on widely spaced distribution ducts located in the bottom of the BFB furnace. Stationary bed material fills the hoppers and furnace bottom up to the level of the bubble caps, above which the bed material is fluidized by the air flow. The open spacing is effective in removing larger rocks and debris from the active bed area as bed material moves down through hoppers. This design is particularly attractive in biomass and waste fuel applications, which contain non-combustible debris. In the flat floor system illustrated in FIG. 3, the floor of the furnace is formed by horizontal water-cooled membrane panels with bubble caps. Air passes from a windbox below the water-cooled panel through the bubble caps to enter and fluidize the bed material. Separate bed drains are provided. The membrane panel floor must form an airtight seal with the furnace walls, must support the weight of a slumped bed, and must resist the uplift generated from the air pressure drop during operation. This design is attractive for firing coal where there is much less large debris present.

Coal-fired bubbling-bed boilers normally incorporate a recycle system that separates the solids leaving the economizer from the gas and recycles them to the bed. This maximizes combustion efficiency and sulfur capture. Normally, the amount of solids recycled is limited to about 25% of the combustion gas weight. For highly reactive fuels such as biomass, this recycle system is usually omitted.

The typical operating temperature range of a bubbling bed is 1350° F. to 1650° F. (about 732° C. to about 899° C.), depending on the fuel moisture, ash content, and alkali content in the ash. Even at these low combustion temperatures, the high convective and radiative heat transfer from the bulk bed material to the fuel particles provides sufficient ignition energy to evaporate moisture, heat the ash, and still combust the remaining fuel without significantly changing the instantaneous bed temperature. This is why the bubbling bed can burn low-grade fuels, which burn at low combustion temperatures due to their high moisture and ash contents.

A heat transfer surface may be placed within the bed depending upon the fuel being burned. For biomass and other low heating value fuels, no in-bed surface is usually required because other methods of bed temperature control can be used. For coal firing with its high heat content and lower relative volatility, the heat transfer surface, in the form of a tube bundle, is placed in the bed to achieve the desired heat balance and bed operating temperature. Typically, the bed temperature is uniform, plus or minus about 25° F. (about 14° C.), as a result of the vigorous mixing of gas and solids.

Biomass firing can require the control of carbon monoxide (CO), volatile organic compounds (VOCs), $NO_x$, $SO_2$ and hydrochloric acid (HCl). The CO and VOCs are controlled by good fluidization, uniform fuel distribution and high-velocity overfire air nozzles, and are easily controlled below 100 ppm and 10 ppm respectively at 7 percent $O_2$ dry. NO is typically controlled by bed temperature control with a two-stage overfire air system and/or a selective non-catalytic reduction (SNCR) system *Steam/its generation and use,* $42^{nd}$ Edition, Tomei Editor, Copyright 2015, The Babcock & Wilcox Company, Barberton, Ohio, U.S.A. (see, e.g., Chapter 35). The staged overfire air system provides approximately 15 percent to 25 percent reduction, and the SNCR system provides approximately 55 percent to 60 percent reduction.

$SO_2$ and HCl are controlled by adding limestone to the bed. $SO_2$ can be reduced 80 percent with a significant Ca/S molar ratio because of the very low sulfur content in most biomass fuels. However, the air flow through the bed must be high enough to complete the sulfation process. HCl is reduced by the excess lime leaving the bed and by using a fabric filter baghouse for particulate collection, providing the proper temperature and solids/gas contact.

Coal firing requires $SO_2$ emission control. $SO_2$ reduction can be as high as 90 percent with a high-solids recycle rate from a multi-cyclone dust collector (MDC). $NO_x$ is only moderately low from a coal-fired BFB boiler. The bed and furnace temperatures are low, which reduces thermal $NO_x$ formation. However, air flow through the bed is at or above theoretical combustion air. Therefore, the $NO_x$ reduction possible by staging the combustion air is not available for coal-fired BFB boilers. Typical $NO_x$ values are 0.4 to 0.5 lb/$10^6$ Btu (0.47 to 0.59 mg/$Nm^3$ at 7% $O_2$ dry).

Currently methods for $NO_x$ reduction on flue gases generated from biomass combustion use ammonia/urea injection into the upper furnace zone (oxygen-rich zone) know as Selective Non-Catalytic Reduction (SNCR) and/or ammonia injection with a catalyst known as Selective Catalytic Reduction (SCR) (also into an oxygen-rich zone). The SNCR system is a more economical system but has limited reduction efficiency and ability to control unused ammonia (ammonia slip) leaving with the flue gas. In addition, the optimum SNCR temperature operating window is limited to 1500° F. to 1650° F. (815° C. to 900° C.). The SCR system has the ability to perform with higher reduction efficiency and lower ammonia slip but at a higher capital cost as compared to SNCR. Additionally, while both the US and the non-US market for renewable energy have $NO_x$ emission limits that could be controlled by the use of a Selective Non-Catalytic Reduction (SNCR) system, such SNCR systems cannot meet the $NO_x$ control needs of all operating conditions and/or fuel conditions.

Given the above, the nitrogen oxides that are invariably generated during the combustion of coal, as well as other types of combustible fuels such as biomass, due to the presence of air must be adequately controlled. Further, biomass and fossil fuel boilers are required to operate at lower loads more frequently to accommodate the variable availability of renewable power sources such as wind and solar. Given that SNCR systems are expensive and/or complex to design and implement, a technology is needed that permits the realization of a less expensive SNCR system that is still able to achieve $DeNO_x$ ($NO_x$ reduction) under low load or unit turndown operation for biomass combustion in a bubbling fluidized bed (BFB) boiler. At present, conventional SNCR systems are not capable of achieving $NO_x$ reduction under low load operation due to low operating temperatures below the effective temperature range of SNCR operation.

Additionally, there is a need for a technology that leads to an improvement of an SNCR $DeNO_x$ capability for a circulating fluidized bed (CFB) boiler that utilizes one or more types of solid fuel (e.g., coal, a mixture of coal and biomass, etc.) as a combustion source. This is due to the fact that typically the full load operating conditions of CFB are similar to low load operating conditions of BFB. Such a technology would permit a user to achieve favorable $NO_x$ reduction using SNCR technology comparable to that of a CFB with a cyclone primary particle separator. Finally, there is a need for a technology that can be coupled with traditional SNCR to get overall high $NO_x$ reduction across all load conditions.

SUMMARY OF THE INVENTION

The present invention relates generally to the field of emission control equipment for boilers, heaters, kilns, or other flue gas-, or combustion gas-, generating devices (e.g., those located at power plants, processing plants, etc.) and, in particular to a new and useful method and apparatus directed to one or more of: (i) reducing the levels of $NO_x$ from one or more types of combustors, furnaces or boilers; (ii) reducing the levels of $NO_x$ from one or more types of biomass combustors, furnaces or boilers; or (iii) reducing the levels of $NO_x$ from one or more types of fluidized bed biomass combustors, furnaces or boilers. In one embodiment, the method and apparatus of the present invention permit the use of a less complex and/or expensive system to accomplish selective non-catalytic reduction (SNCR) and enable one to achieve $DeNO_x$ ($NO_x$ reduction) under low load or unit turndown operation for biomass combustion in a bubbling fluidized bed (BFB) boiler.

In one embodiment, the present invention relates to a method for reducing emissions from a boiler, the method comprising the steps of: (A) supplying fuel to a boiler; (B) combusting the fuel in the boiler, wherein the combustion of the fuel in the boiler produces a flue gas stream containing at least one type of nitrogen-based emissions; (C) injecting into the boiler at least one type of ammonia-containing compound; and (D) allowing the at least one ammonia-containing compound to react with the at least one type of nitrogen-based emissions, wherein the reaction between the at least one ammonia-containing compound and the at least one type of nitrogen-based emissions results in a reduction in the amount of $NO_x$ emitted in the flue gas stream.

In another embodiment, the present invention relates to a method for reducing emissions from a boiler, the method comprising the steps of: (I) supplying fuel to a boiler; (II) combusting the fuel in the boiler using staged combustion, wherein the combustion of the fuel in the boiler produces a flue gas stream containing at least one type of nitrogen-based emissions; (III) injecting into the boiler at least one type of ammonia-containing compound; and (IV) allowing the at least one ammonia-containing compound to react with the at least one type of nitrogen-based emissions, wherein the reaction between the at least one ammonia-containing compound and the at least one type of nitrogen-based emissions results in a reduction in the amount of $NO_x$ emitted in the flue gas stream.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which exemplary embodiments of the invention are illustrated.

DESCRIPTION OF THE INVENTION

Figure 1:
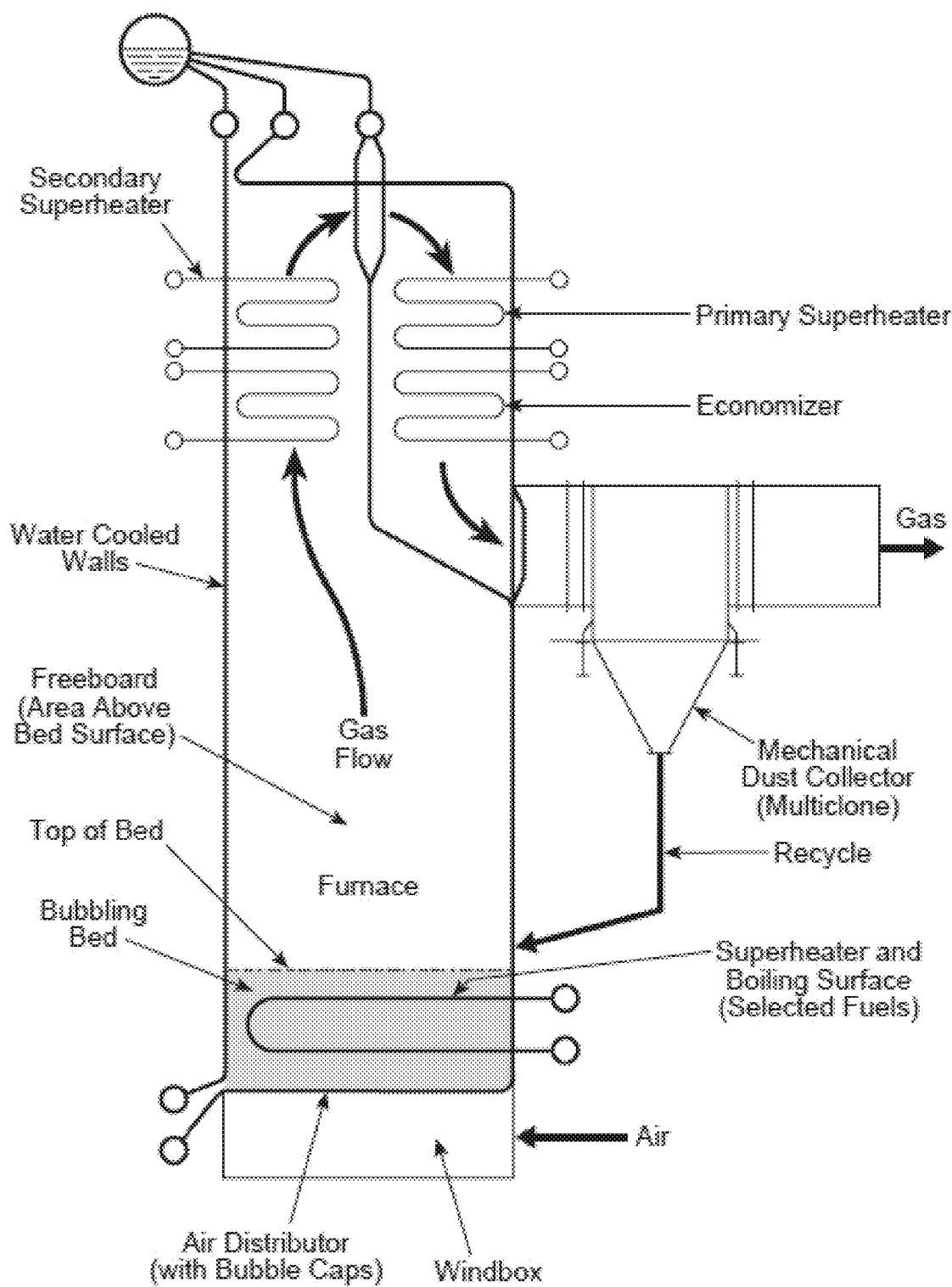
FIG. 1 is an illustration of the main features of a bubbling fluidized-bed (BFB) boiler.
Figure 2:
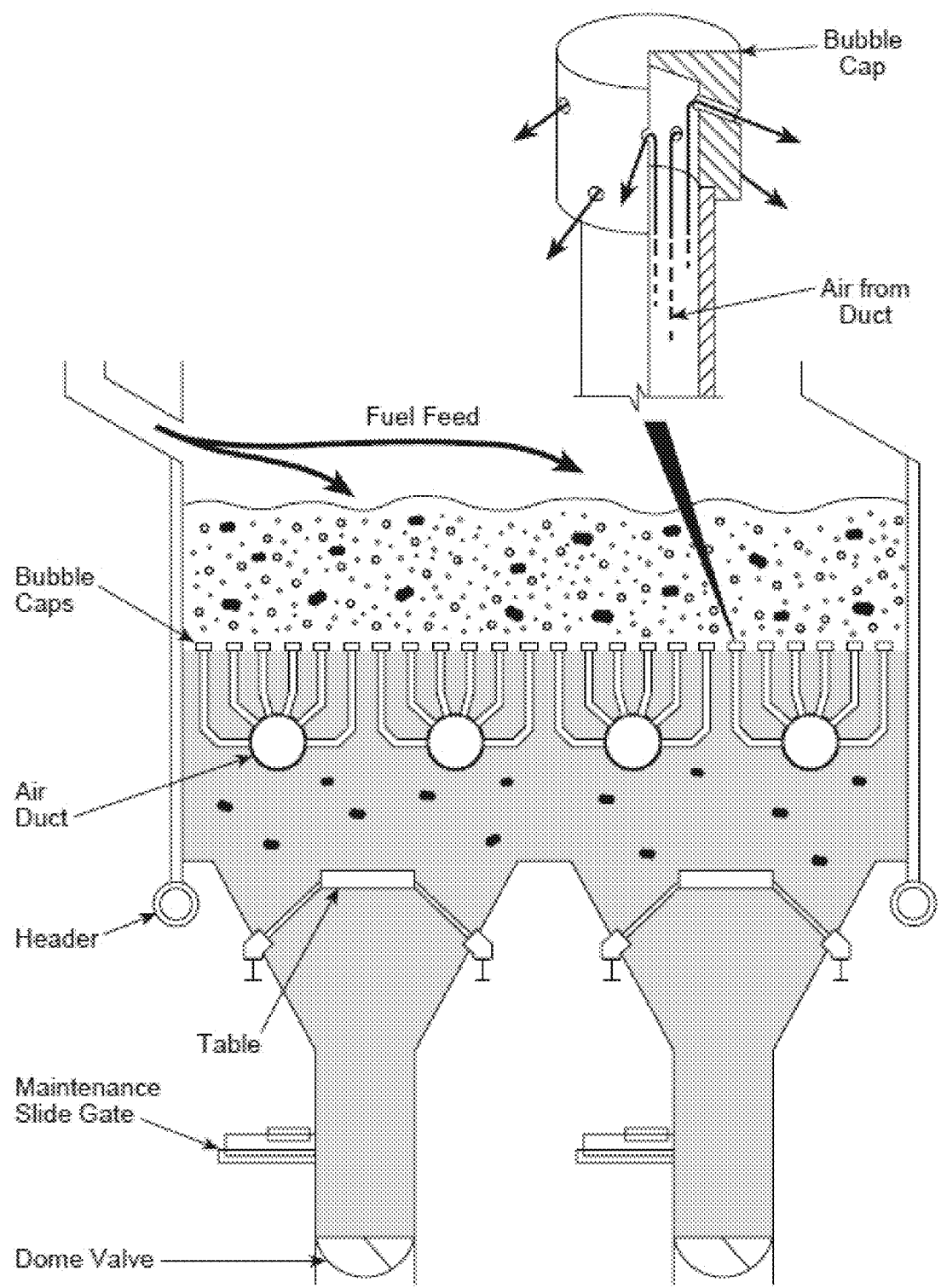
FIG. 2 is an illustration of a BFB boiler with an open bottom system.
Figure 3:
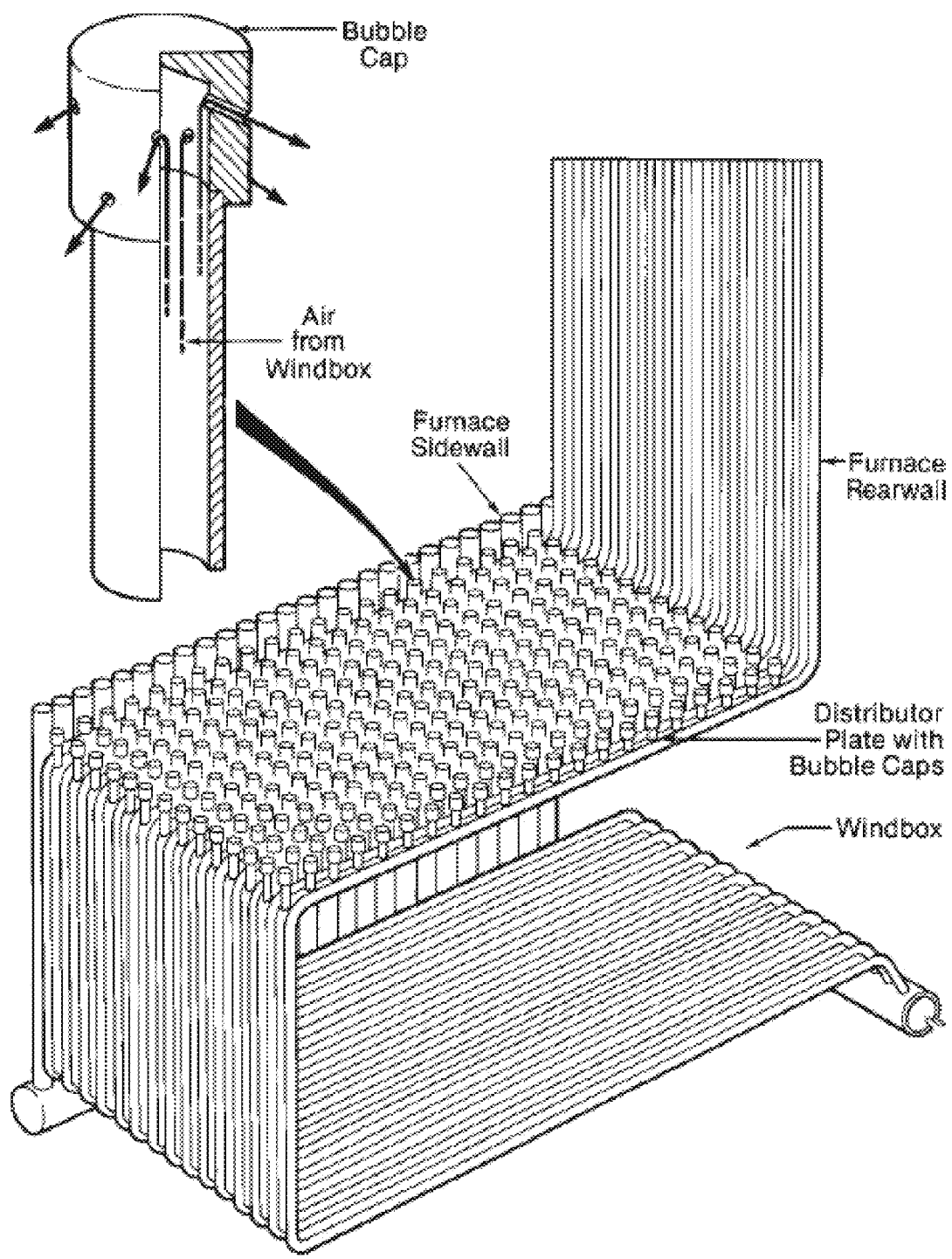
FIG. 3 is an illustration of a BFB boiler with an flat floor system.
Figure 4:
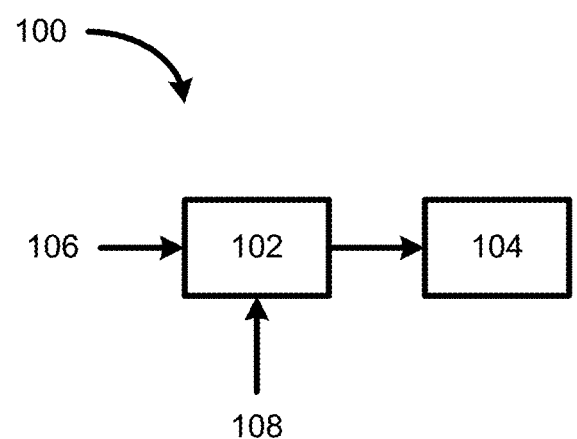
FIG. 4 is an illustration of one system of the present invention.

The present invention relates generally to the field of emission control equipment for boilers, heaters, kilns, or other flue gas-, or combustion gas-, generating devices (e.g., those located at power plants, processing plants, etc.) and, in particular to a new and useful method and apparatus directed to one or more of: (i) reducing the levels of $NO_x$ from one or more types of combustors, furnaces or boilers; (ii) reducing the levels of $NO_x$ from one or more types of biomass combustors, furnaces or boilers; or (iii) reducing the levels of $NO_x$ from one or more types of fluidized bed biomass combustors, furnaces or boilers. In one embodiment, the method and apparatus of the present invention permit the use of a less complex and/or expensive system to accomplish selective non-catalytic reduction (SNCR) and enable one to achieve $DeNO_x$ ($NO_x$ reduction) under low load or unit turndown operation for biomass combustion in a bubbling fluidized bed (BFB) boiler.

The present invention applies to boilers and/or furnaces that are designed to operate in various modes including, but not limited to, standard combustion, staged combustion, oxy-combustion, etc. It should be noted that some of the boilers and/or furnaces to which the present invention is applicable to may contain one or more over fire air (OFA) ports for supplying over fire air to a desired combustion process. Given the knowledge attributable to those of skill in the art, a detailed discussion of combustion process that utilize OFA is omitted for the sake of brevity but can be found in detail in *Steam/its generation and use*, 42$^{nd}$ Edition, Tomei Editor, Copyright 2015, The Babcock & Wilcox Company, Barberton, Ohio, U.S.A.

In one embodiment, the method of the present invention is an advanced SNCR method that is accomplished by adding ammonia and/or an ammonia-containing compound, to a zone in a fluidized bed combustor operating with a one or more biomass fuels or other solid fuels (e.g., coal, a mixture of coal and biomass, etc.). In one embodiment, the addition point is one or more points where the solid biomass fuel or other solid fuel is fed to the boiler. In one embodiment, the ammonia and/or the ammonia-containing compound is selected from one or more of gaseous ammonia, anhydrous ammonia gas that is compressed into a liquid form, ammonia acetate, urea (i.e., $CH_4N_2O$ or $CO(NH_2)_2$), methanolamine ($OHCH_2NH_2$), monoethanolamine ("MEA"—$C_2H_7NO$ or $HOCH_2CH_2NH_2$), aminoethanol ($OHCH_2(CH_3)NH_2$), methylamine ($CH_3NH_2$), ethylamine ($CH_3CH_2NH_2$), aniline ($Ph-NH_2$). In another embodiment, the ammonia and/or the ammonia-containing compound of the present invention is selected from one or more of ammonia, anhydrous ammonia gas that is compressed into a liquid form, ammonium acetate or any other suitable inorganic ammonia-containing compound (e.g., ammonium azide, ammonium benzoate, ammonium peroxyborate, ammonium bromate, ammonium bromide, ammonium carbamate, ammonium carbonate, ammonium bicarbonate, ammonium chlorate, ammonium chloride, ammonium fluoride, ammonium hydroxide, ammonium iodate, ammonium iodine, etc.), urea (i.e., $CH_4N_2O$ or $CO(NH_2)_2$), primary alkanolamines of the general formula HO—$R_1$—$NH_2$ where $R_1$ is a straight alkyl group having between 1 and 20 carbon atoms or a branched alkyl group having between 2 and 20 carbon atoms, primary alkylamines of the general formula $R_1$—$NH_2$ where $R_1$ is a straight alkyl group having between 1 and 20 carbon atoms or a branched alkyl group having between 3 and 20 carbon atoms, or any suitable combination of two or more thereof, three or more thereof, four or more thereof, or even any combination of five or more thereof.

In one embodiment, the ammonia or the ammonia-containing compound has a purity of anywhere in the range of about 10 weight percent to 100 weight percent, or from about 12.5 weight percent to about 99.5 weight percent, or from about 15 weight percent to about 97.5 weight percent, or from about 17.5 weight percent to about 95 weight percent, or from about 20 weight percent to about 92.5 weight percent, or from about 22.5 weight percent to about 90 weight percent, or from about 25 weight percent to about 87.5 weight percent, or from about 27.5 weight percent to about 85 weight percent, or from about 30 weight percent to about 82.5 weight percent, or from about 32.5 weight percent to about 80 weight percent, or from about 35 weight percent to about 77.5 weight percent, or from about 37.5 weight percent to about 75 weight percent, or from about 40 weight percent to about 72.5 weight percent, or from about 42.5 weight percent to about 70 weight percent, or from about 45 weight percent to about 67.5 weight percent, or from about 47.5 weight percent to about 65 weight percent, or from about 50 weight percent to about 62.5 weight percent, or from about 52.5 weight percent to about 60 weight percent, or even from about 55 weight percent to about 57.5 weight percent, with the remainder of the weight percent of the material injected with the ammonia or the ammonia-containing compound being one or more carrier materials (e.g., water or steam, a suitable alcohol, combustible fuel, etc.), any inert material or any one or more impurities. Here, as well as elsewhere in the specification and claims, individual numerical values can be combined to form additional and/or non-disclosed ranges.

Regarding the nature of the particle geometry and/or size of any solid ammonia-containing compound utilized in conjunction with the present invention, the present invention is not bound to any one particle geometry and/or particle size. In one embodiment, any solid-based ammonia-containing compound of the present invention can be of any particle shape with at least about 60 weight percent, at least about 65 weight percent, at least about 70 weight percent, at least about 75 weight percent, at least about 80 weight percent, at least about 85 weight percent, at least about 90 weight percent, at least about 95 weight percent, or even at least about 97.5 weight percent of the sorbent having a particle size in the range of about 5 µm to about 200 µm. Here, as well as elsewhere in the specification and claims, individual numerical values can be combined to form additional and/or non-disclosed ranges.

It should be noted that the present invention is not limited to any one injection rate of the ammonia or the ammonia-containing compound. As will be understood by those of skill in the art, the rate at which the ammonia or the ammonia-containing compound of the present invention are injected into the one or more addition points of the boiler, BFB boiler or CFB boiler will depend on a number of factors which will differ from boiler to boiler. Such factors include, but are not limited to, boiler size, boiler type, fuel type, fuel chemical composition, boiler fuel usage, etc.

Accordingly, in light of the above, the present invention can be accomplished with liquid injection into a suitable zone of a boiler, BFB boiler and/or CFB boiler, or by adding a solid form of ammonia (i.e., urea or one or more other ammonia-rich compounds) to the solid fuel being used in, or supplied, to boiler, BFB boiler and/or CFB boiler resulting in the release of ammonia in the bed as the solid fuel is combusted.

As seen from the data below, testing was conducted on a fluidized-bed boiler using a biomass fuel at a 30 percent operating load so that the $DeNO_x$ zone under such conditions (e.g., based on temperature) is primarily located in the freeboard zone of the boiler (see FIG. 1—the area just above the fluidized bed). Additionally, under low-load operation, the bed operates at higher stoichiometry and as a result, it is theorized that $NO_x$ formation is completely from the nitrogen contained in the fuel as it is theorized that no thermal $NO_x$ formation occurs due to a gas temperatures less than 2000° F. It should be noted that the preceding theory is to be viewed as non-limiting. Given the above, the present invention seeks to add ammonia alone, one or more ammonia-containing compounds alone, or any combination of ammonia and one or more ammonia-containing compounds (all generically referred to in the claims as one or more ammonia-containing compounds) externally to the bed with the fuel and/or in addition to the fuel so as to permit the ammonia alone, one or more ammonia-containing compounds alone, or any combination of ammonia and one or more ammonia-containing compounds to react with $NO_x$ in the fluidized-bed boiler and thus achieve $DeNO_x$.

Table 1 below shows the $NO_x$ reduction obtained under different boiler operating conditions using biomass fuel having urea added thereto. In the table below, the boiler load as expressed as the Maximum Continuous Rating is shown as MCR.

TABLE 1

| Percent Load | Urea Addition Rate (lb/hr) | Bed Stoichiometry | Average $NO_x$ (ppm) | Percent $DeNO_x$ |
|---|---|---|---|---|
| 30% of MCR before urea addition | 0 | 0.7 | 50 | N/A |
| 30% of MCR after urea addition | 60 | 0.7 | 30 | 40% |
| 30% of MCR before urea addition | 0 | 0.7 | 55 | N/A |
| 30% of MCR after urea addition | 45 | 0.7 | 35 | 37 |
| 50% MCR before urea addition | 0 | 0.6 | 70 | N/A |
| 50% MCR after urea addition | 100 | 0.6 | 59 | 15% |
| 55% MCR before urea addition | 0 | 0.5 | 75 | N/A |
| 55% MCR after urea addition | 60 | 0.5 | 85 | −13% |

It is observed that at around 30 percent to 50 percent load operation, the injected and/or supplied urea produced ammonia which helps to achieve the observed/reported NO reduction. However, at a 55 percent load, there is an increase in NON. While not wishing to be bound to any one theory, it is believed that this can be explained by the fact that at a 55 percent load or greater, there is a significant increase in over fire air which may result in the ammonia generated from the urea oxidizing into $NO_x$ rather than reacting with NO produced by the combustion, or staged combustion, of the biomass fuel and/or the solid fuel (e.g., coal, a mixture of coal and biomass, etc.).

Below is a table summarizing the NO data from a two waste fuel stream BFB boiler test. Note the primary zone stoichiometry during ammonia-rich syrup injection tests is in the range of 0.8 to 1.0. Although there is a slight decrease in primary zone stoichiometry between test conditions without ammonia-rich syrup injection and with ammonia-rich syrup injection, the difference is not sufficient to explain the significant reduction in NO that is observed.

TABLE 2

| Percent Load | Solid Biomass (lb/min) | Primary Zone Stoichiometry | Ammonia Rich Syrup (lb/min) | Average $NO_x$ (ppm) | Percent $DeNO_x$ | Ammonia Slip (ppm) |
|---|---|---|---|---|---|---|
| 100% | 1.33 | 1.07 | 0 | 204 | 0 | 0 |
| 100% | 1.27 | 0.88 | 0.52 | 93 | 54.4 | 0 |
| 100% | 1.41 | 1.14 | 0 | 184 | 0 | 0 |
| 100% | 1.38 | 0.96 | 0.52 | 99.8 | 45.8 | 0 |
| 100% | 1.34 | 1.02 | 0 | 178 | 0 | 0 |
| 100% | 1.22 | 0.78 | 0.52 | 70 | 60.7 | 0 |

While these results may seem to contradict the results of Table 1 (which indicated possible levels of ammonia slip at all load points and increased $NO_x$ at higher loads), further investigation found that the ammonia-rich syrup waste used to obtain the data of Table 2 also had forms of plant sugar present.

Further bench-scale testing to investigate and verify the results observed on the pilot facility reveal that the mechanism for $NO_x$ control with ammonia injection in the primary zone is most effective at higher primary zone stoichiometries. It is also observed that ammonia (as ammonia acetate and urea) injection causes an increase in $NO_x$ emissions for primary zone stoichiometries below 0.68 and a $NO_x$ decrease for primary zone stoichiometries near 1.0. While not wishing to be bound to any one theory, it is probable that injecting nitrogen-containing compounds just above the bed serves to increase the concentration of NO precursors that form NO when overfire air is added.

While not wishing to be bound to any one theory, it is also hypothesized that the excepted mechanism behind the $NO_x$ reduction is due to the presence of sucrose and other carbohydrates in the syrup. The sucrose dissociates under combustion conditions and the products of dissociation react with ammonia to form nitrogen. While not wishing to be bound to any one theory, it is believed that due to the injection of the ammonia-containing compound/urea that nitrogen once formed cannot be oxidized back to NO as the operating temperature of fluidized bed boiler is lower than the temperature required for thermal NO formation. In another embodiment, the addition of one or more sugar-like compounds including, but not limited to plant-based sugars to the ammonia/ammonia-containing compound of the present invention yields a $DeNO_x$ solution/solid compound that appears to enhance the reduction and reduce the ammonia slip.

Traditionally, primary zone stoichiometries are maintained at values less than about 0.7 in biomass BFBs to inhibit NO formation. Operating at low primary zone stoichiometries however puts additional burden on the design of the overfire air system to achieve complete combustion while maintaining low NON. Accordingly, in some instances, the overfire air system of a boiler may need to be more sophisticated and more costly to achieve these competing goals. However, with the addition of ammonia, urea and/or one or more ammonia-containing compounds in a primary zone of a boiler in accordance with the present invention, it may be possible to operate at a higher primary zone stoichiometry to promote complete combustion while simultaneously achieving lower overall NO emissions at a lower overall boiler cost.

In light of the above, the present invention can be further explained in light of system 100 where a boiler 102 is designed to combust a fuel such as a solid fuel (e.g., coal, a mixture of coal and biomass, etc.) or any type of biomass-based fuel and generate a flue gas stream of combustion products that are fed to one or more downstream Air Quality Control System (AQCS) devices generically represented by box 104. Suitable AQCS devices include, but are not limited to, one or more SCRs (be they hot-side, cold-side, or both), one or more SNCRs, one or more bag houses (for particulate control), one or more electrostatic precipitators (ESPs—for particulate control), one or more mercury control devices and/or systems, one or more flue gas desulfurization units (be the dry flue gas sulfurization units and/or wet flue gas desulfurization units) and/or one or more of any other type of emissions control technologies to control reduce and/or mitigate the emission of any one or more types of undesirable elements, chemicals and/or compounds. While multiple AQCS devices are represented herein solely by box 104, those of skill in the art will recognize that any number of devices may be present depending on the emission control needs of boiler 102 and/or one or more emission limits that need to be met. Turning to arrow 106, arrow 106 represents the fuel feed being supplied to boiler 102. As discussed herein, such fuel can be a solid fuel (e.g., coal, a mixture of coal and biomass, etc.) or any type of biomass-based fuel. Turning to arrow 108, arrow 108 represents the feed where one or more ammonia-containing compounds are supplied to boiler 102. The nature and/or type of the one or more ammonia-containing compounds supplied to boiler 102 are discussed in detail above. As such, a rehash of this portion of the present invention is omitted for the sake of brevity. As noted above, point at which ammonia-containing feed 108 enters boiler 102 is at any point prior to $NO_x$ formation, or in the case of a BFB and/or a CFB at a location that is primarily located in the freeboard zone of the boiler. It should be noted that in an alternative embodiment, the feeds represented by arrows 106 and 108 can be combined into one feed and the other feed eliminated due to the inclusion of the one or more ammonia-containing compounds being added to the boiler's fuel feed prior to combustion thereof.

While specific embodiments of the present invention have been shown and described in detail to illustrate the application and principles of the invention, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims.

What is claimed is:

1. A method for reducing emissions from a boiler, the method comprising the steps of:
    (A) supplying fuel to a boiler, wherein the fuel is a combination of coal and biomass;
    (B) combusting the combination of coal and biomass fuel in the boiler using staged combustion, wherein the combustion of the combination of coal and biomass fuel in the boiler produces a flue gas stream containing at least one type of nitrogen-based emissions;
    (C) injecting into the boiler a combination of at least one type of ammonia-containing compound and at least one type of sugar-like compound; and
    (D) allowing the combination of the at least one ammonia-containing compound and the at least one type of sugar-like compound to react with the at least one type of nitrogen-based emissions,
    wherein the reaction between the combination of the at least one ammonia-containing compound and the at least one type of sugar-like compound with the at least one type of nitrogen-based emissions results in a reduction in the amount of $NO_x$ emitted in the flue gas stream.

2. The method of claim 1, wherein the boiler is a circulating fluidized bed boiler or a bubbling fluidized-bed boiler.

3. The method of claim 2, wherein the boiler is a circulating fluidized bed boiler.

4. The method of claim 1, wherein the addition of the at least one sugar-like compound to the ammonia-containing compound of the present invention yields a $DeNO_x$ compound that enhances $NO_x$ reduction and reduces ammonia slip.

5. The method of claim 1, wherein the at least one ammonia-containing compound is selected from one or more of gaseous ammonia, anhydrous ammonia gas that is compressed into a liquid form, ammonia acetate, urea, methanolamine, monoethanolamine, aminoethanol, methylamine, ethylamine, aniline, or mixtures of any two or more thereof.

6. The method of claim 1, wherein the at least one ammonia-containing compound is selected from one or more of ammonia, anhydrous ammonia gas that is compressed into a liquid form, ammonium acetate, ammonium azide, ammonium benzoate, ammonium peroxyborate, ammonium bromate, ammonium bromide, ammonium carbamate, ammonium carbonate, ammonium bicarbonate, ammonium chlorate, ammonium chloride, ammonium fluoride, ammonium hydroxide, ammonium iodate, ammonium iodine, urea, primary alkanolamines of the general formula $HO—R_1—NH_2$ where $R_1$ is a straight alkyl group having between 1 and 20 carbon atoms or a branched alkyl group having between 2 and 20 carbon atoms, primary alkylamines of the general formula $R_1—NH_2$ where $R_1$ is a straight alkyl group having between 1 and 20 carbon atoms or a branched alkyl group having between 3 and 20 carbon atoms, or mixtures of any two or more thereof.

7. The method of claim 1, wherein the injection of the combination of the at least one type of ammonia-containing compound and the at least one type of sugar-like compound in Step (C) occurs in the boiler.

8. The method of claim 1, wherein the injection of the combination of the at least one type of ammonia-containing compound and the at least one type of sugar-like compound in Step (C) occurs via addition of the combination of the at least one type of ammonia-containing compound and the at least one type of sugar-like compound to the fuel prior to the fuel being supplied to the boiler.

9. The method of claim 1, wherein the injection of the combination of the at least one type of ammonia-containing compound and the at least one type of sugar-like compound in Step (C) occurs adjacent to at least one fuel feed port of the boiler.

10. The method of claim 1, wherein the injection of the combination of the at least one type of ammonia-containing compound and the at least one type of sugar-like compound in Step (C) occurs above the fuel feed of the boiler but below at least one of any over-fired air ports of the boiler.

11. The method of claim 1, wherein the injection of the combination of the at least one type of ammonia-containing compound and the at least one type of sugar-like compound in Step (C) occurs above one or more of over fired air ports and prior to the exit of the boiler.

12. A method for reducing emissions from a boiler, the method comprising the steps of:
    (I) supplying fuel to a boiler, wherein the fuel is biomass;
    (II) combusting the biomass fuel in the boiler using staged combustion, wherein the combustion of the biomass fuel in the boiler produces a flue gas stream containing at least one type of nitrogen-based emissions;
    (III) injecting into the boiler a combination of at least one type of ammonia-containing compound and at least one type of sugar-like compound; and
    (IV) allowing the combination of the at least one ammonia-containing compound and the at least one type of sugar-like compound to react with the at least one type of nitrogen-based emissions,
    wherein the reaction between the combination of the at least one ammonia-containing compound and the at least one type of sugar-like compound with the at least one type of nitrogen-based emissions results in a reduction in the amount of $NO_x$ emitted in the flue gas stream.

13. The method of claim 12, wherein the boiler is a circulating fluidized bed boiler or a bubbling fluidized-bed boiler.

14. The method of claim 13, wherein the boiler is a circulating fluidized bed boiler.

15. The method of claim 12, wherein the addition of the at least one sugar-like compound to the ammonia-containing compound of the present invention yields a DeNO$_x$ compound that enhances NO$_x$ reduction and reduces ammonia slip.

16. The method of claim 12, wherein the at least one ammonia-containing compound is selected from one or more of gaseous ammonia, anhydrous ammonia gas that is compressed into a liquid form, ammonia acetate, urea, methanolamine, monoethanolamine, aminoethanol, methylamine, ethylamine, aniline, or mixtures of any two or more thereof.

17. The method of claim 12, wherein the at least one ammonia-containing compound is selected from one or more of ammonia, anhydrous ammonia gas that is compressed into a liquid form, ammonium acetate, ammonium azide, ammonium benzoate, ammonium peroxyborate, ammonium bromate, ammonium bromide, ammonium carbamate, ammonium carbonate, ammonium bicarbonate, ammonium chlorate, ammonium chloride, ammonium fluoride, ammonium hydroxide, ammonium iodate, ammonium iodine, urea, primary alkanolamines of the general formula HO—R$_1$—NH$_2$ where R$_1$ is a straight alkyl group having between 1 and 20 carbon atoms or a branched alkyl group having between 2 and 20 carbon atoms, primary alkylamines of the general formula R$_1$—NH$_2$ where R$_1$ is a straight alkyl group having between 1 and 20 carbon atoms or a branched alkyl group having between 3 and 20 carbon atoms, or mixtures of any two or more thereof.

18. The method of claim 12, wherein the injection of the combination of the at least one type of ammonia-containing compound and the at least one type of sugar-like compound in Step (III) occurs in the boiler.

19. The method of claim 12, wherein the injection of the combination of the at least one type of ammonia-containing compound and the at least one type of sugar-like compound in Step (III) occurs via addition of the combination of the at least one type of ammonia-containing compound and the at least one type of sugar-like compound to the fuel prior to the fuel being supplied to the boiler.

20. The method of claim 12, wherein the injection of the combination of at least one type of ammonia-containing compound and the at least one type of sugar-like compound in Step (III) occurs adjacent to at least one fuel feed port of the boiler.

21. The method of claim 12, wherein the injection of the combination of at least one type of ammonia-containing compound and the at least one type of sugar-like compound in Step (C) Step (III) occurs above the fuel feed of the boiler but below at least one of any over-fired air ports of the boiler.

22. The method of claim 12, wherein the injection of the combination of at least one type of ammonia-containing compound and the at least one type of sugar-like compound in Step (III) occurs above one or more of over fired air ports and prior to the exit of the boiler.

* * * * *